US012499696B2

(12) United States Patent
Barth et al.

(10) Patent No.: US 12,499,696 B2
(45) Date of Patent: Dec. 16, 2025

(54) METHOD OF DETERMINING DROWSINESS OF A DRIVER IN A VEHICLE

(71) Applicant: Aptiv Technologies AG, Schaffhausen (CH)

(72) Inventors: Alexander Barth, Wermelskirchen (DE); Timo Rehfeld, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 269 days.

(21) Appl. No.: 18/348,566

(22) Filed: Jul. 7, 2023

(65) Prior Publication Data
US 2024/0020992 A1 Jan. 18, 2024

(30) Foreign Application Priority Data
Jul. 13, 2022 (EP) .................................... 22184607

(51) Int. Cl.
G06V 20/59 (2022.01)
H04N 23/667 (2023.01)

(52) U.S. Cl.
CPC ......... *G06V 20/597* (2022.01); *H04N 23/667* (2023.01)

(58) Field of Classification Search
CPC ...... G06V 20/597; G06V 40/18; G06V 40/23; G06V 10/80; H04N 23/667; G08B 21/06; A61B 5/0022; A61B 5/0075; A61B 5/11; A61B 5/1103; A61B 5/1128; A61B 5/163; A61B 5/18
USPC ....................................................... 382/103
See application file for complete search history.

(56) References Cited

U.S. PATENT DOCUMENTS

| | | | |
|---|---|---|---|
| 7,202,792 B2 | 4/2007 | Zhang et al. | |
| 7,423,540 B2 | 9/2008 | Kisacanin | |
| 8,446,470 B2 | 5/2013 | Lu et al. | |
| 10,121,084 B2 | 11/2018 | Yadhunandan et al. | |
| 10,943,092 B2 | 3/2021 | Margolin et al. | |

(Continued)

FOREIGN PATENT DOCUMENTS

| | | |
|---|---|---|
| EP | 1418082 | 5/2004 |
| EP | 2952403 | 10/2018 |

(Continued)

OTHER PUBLICATIONS

"Extended European Search Report", EP Application No. 22184607.4, Dec. 22, 2022, 9 pages.

(Continued)

*Primary Examiner* — Stephen P Coleman
(74) *Attorney, Agent, or Firm* — Harness, Dickey & Pierce, P.L.C.

(57) ABSTRACT

Systems and techniques are provided for detecting drowsiness of a driver in a vehicle. In aspects, a driver is monitored by capturing an image sequence of an interior of the vehicle via a camera system. The image sequence is then analyzed to extract a characteristic pattern of the driver. An activity level of the driver is determined based on at least one of the image sequence or an output signal provided by another sensor of the vehicle. At least one of the extracted characteristic pattern and the activity level of the driver is selected as a basis for determining a drowsiness signal indicative of the drowsiness of the driver.

19 Claims, 5 Drawing Sheets

(56) References Cited

U.S. PATENT DOCUMENTS

| | | | |
|---|---|---|---|
| 10,993,647 B2 | 5/2021 | Kale et al. | |
| 2016/0137059 A1* | 5/2016 | Mäder | B60K 28/066 |
| | | | 340/575 |

FOREIGN PATENT DOCUMENTS

| | | |
|---|---|---|
| JP | 2013120409 | 6/2013 |
| WO | 2021145131 | 7/2021 |

OTHER PUBLICATIONS

Goodfellow, et al., "Convolutional Networks", Deep Learning Book 1-11 (Chapter 9)—retrieved at: https://www.deeplearningbook.org/contents/convnets.html—on Jun. 18, 2023, pp. 326-366.

Li, et al., "A Multi-Sensor Intelligent Assistance System for Driver Status Monitoring and Intention Prediction", Li Li PhD Thesis Final ISE, Jun. 2016, 183 pages.

Tsujikawal, et al., "Drowsiness Estimation from Low-Frame-Rate Facial Videos using Eyelid Variability Features", Jul. 18, 2018, 4 pages.

* cited by examiner

METHOD OF DETERMINING DROWSINESS OF A DRIVER IN A VEHICLE

INCORPORATION BY REFERENCE

This application claims priority to European Patent Application No. EP22184607.4, filed Jul. 13, 2022, the disclosure of which is incorporated by reference in its entirety.

BACKGROUND

Modern vehicles are often equipped with a driver monitoring system (DMS) which is configured to monitor a driver of a vehicle e.g. by using a red, green, and blue infrared (RGB-IR) camera being able to capture RGB images in the visible range and IR images in the infrared range of the electromagnetic spectrum. One of the tasks of the driver monitoring system is to detect drowsiness of the driver, e.g. by detecting rapid eye movements of the driver based on the signal provided by the camera.

For reliably detecting drowsiness of a driver, however, a high frame rate of the camera is usually required in order to detect the rapid eye movements. If the camera of the driver monitoring system is additionally involved in a further task, e.g. in a video call functionality provided by an infotainment system of the vehicle, the frame rate for monitoring the driver may be reduced such that drowsiness detection may not be reliable anymore.

For example, the camera of the driver monitoring system may be configured to monitor a driver regarding drowsiness based on IR images with a given frame rate. IR images may be used since they allow for monitoring the driver's eyes even if they are hidden behind sunglasses. In this case, a video call may request that every second frame is an RGB image, e.g. that a sequence of IR-RGB-IR-RGB etc. is generated. Since the given frame rate cannot be increased, this leads to a reduced frame rate for the IR images suitable for drowsiness detection which is half of the given frame rate. However, half of the given frame rate may not be sufficient for reliably detecting drowsiness e.g. based on the driver's eye movements. Therefore, the drowsiness detection should be disabled during the video call for the present example.

Disabling the drowsiness detection functionality, however, e.g. during a video call, may not be acceptable in light of regulations and/or the expectations provided by the European New Car Assessment Program (NCAP), for example.

Accordingly, there is a need to provide a method and a system for reliably detecting drowsiness of a vehicle driver regardless of the condition of the hardware used for the detection.

SUMMARY

The present disclosure provides a computer implemented method, a computer system, and a non-transitory computer readable medium according to one or more embodiments described herein.

In one aspect, the present disclosure is directed at a computer implemented method for determining drowsiness of a driver in a vehicle. The driver is monitored by capturing an image sequence of an interior of the vehicle via a camera system. A drowsiness signal indicative of the drowsiness of the driver is determined by performing the following operations via a processing unit: the image sequence is analyzed to extract a characteristic pattern of the driver, wherein the characteristic pattern is indicative of drowsiness of the driver. An activity level of the driver is determined based on the image sequence and/or an output signal provided by a sensor of the vehicle. Finally, at least one of the extracted characteristic pattern and the activity level associated with the driver is selected as a basis for determining the drowsiness signal, wherein the selecting depends on a frame rate of the image sequence, a confidence level assigned to the characteristic pattern, and/or a confidence level assigned to the activity level.

The camera system may include, for example, an RGB-IR camera which is able to capture RGB images for human vision as well as an infrared spectrum. Such a camera may be positioned in a cabin of the vehicle and may have an instrumental field of view which is able to cover one or more occupants of the vehicle and which may provide a good visibility of the driver's head and torso region. The camera system may also include another type of camera having a different sensor configuration than RGB-IR, e.g. RGGB, NIR, RCCC etc. Moreover, the camera system may include more than one camera, and such a plurality of cameras may include different sensor types.

The characteristic pattern may include a typical movement sequence of the driver being able to indicate drowsiness, e.g. eye opening, frequency of eye blinking, a change of the viewing direction etc. Additionally or alternatively, a full facial region and/or information regarding the body posture of the driver may be considered for defining the characteristic pattern associated with indicating drowsiness.

The drowsiness signal may be associated with a probability for a drowsy condition of the driver being present. For example, if the drowsiness signal has a high value, e.g. close to 1, and exceeds a predefined threshold, this may indicate that the driver is in a drowsy condition. In this case, the drowsiness signal may cause an alert of a warning system and/or adjust settings of an advanced driver assistance system (ADAS) such that e.g. the vehicle will brake sooner, keep a larger distance to other vehicles or obstacles. In addition, a warning threshold of the ADAS may be lowered.

If the characteristic pattern is related to eye opening dynamics of the driver, the drowsiness signal may be directly associated with certain characteristics of the eye opening dynamics. For example, an eye blink frequency and/or a time period for a closed state of the driver's eyes may be determined and directly associated with the drowsiness signal, e.g. via a predefined lookup table. Alternatively or additionally, yawning detection or detection of certain head movements of the driver may be performed and considered as characteristic pattern when determining the drowsiness signal.

Accordingly, the characteristic pattern may not be related to the driver's eyes only. Hence, such a characteristic pattern related e.g. to the driver's torso may also be recognized in case that the movement of the driver's eyes cannot be monitored. Due to the direct association of the drowsiness signal with the characteristic pattern, the drowsiness signal derived from the characteristic pattern may also be regarded as a measured drowsiness signal.

In order to enhance the reliability of the drowsiness detection, the driver's activity level is determined and considered as a further parameter for detecting drowsiness of the driver. The activity level may represent a probability of the driver being in an active condition. Accordingly, a score may be defined for the activity level which may be close to 1 if an intense activity of the driver can be detected and which may be close to 0 if almost no activity of the driver is present.

For example, a high activity level may be determined if it can be derived from the image sequence or from the output signal of the sensor of the vehicle that the driver is currently speaking. Such an activity associated with speaking may be derived from mouth movements visible in the image sequence or from a signal provided by a microphone of the vehicle. Drowsiness may be detected in an audio signal provided by the microphone, e.g. based on a language or speech pattern of the driver. In other words, the driver's activity level may be determined based on the audio signal, and the drowsiness signal may be derived therefrom. For example, a low driver drowsiness may be detected if a high activity level of the driver is determined, and a high driver drowsiness may be detected if a low activity level of the driver is present. Moreover, the drowsiness signal may be initialized by a certain value, e.g. based on the characteristic pattern, and updated by considering the activity level.

For determining the drowsiness signal, the characteristic pattern or the activity level or both of the characteristic pattern and the activity level are considered. That is, the characteristic pattern and the activity level may be mapped to or represented by respective signals which are weighted for determining the drowsiness signal. The weights of the respective signals may depend on the frame rate of the camera systems and on the respective confidence levels assigned to the characteristic pattern and to the activity level.

The extracted characteristic pattern and the determined activity level may be mapped to the respective signals which indicate a certain drowsiness of the driver and are used for determining the drowsiness signal as described above. That is, there may be a predetermined relationship between the characteristic pattern and the activity level on one hand and the drowsiness signal on the other hand. Moreover, a machine learning algorithm may be used to implement the mapping of the characteristic pattern and/or the activity level to the drowsiness signal.

The camera system may be operated with different frame rates when providing the image sequence. For example, the image sequence may be provided with a high frame rate if the camera system is used for monitoring the driver only and does not perform another task. In contrast, if the camera system is also involved in a different task at the same time, the rate of the image frames may be reduced due to the additional task which is performed in the vehicle, e.g. by an infotainment system, in addition to monitoring the driver via the camera system. For example, a video call may be initiated by the infotainment system such that the camera system may be used for projecting a video, e.g. in a rear mirror of the vehicle. Other reasons for the reduced rate of image frames may be e.g. power savings or thermal degradation.

If the camera system is operated with a sufficiently high frame rate such that the characteristic pattern can be recognized reliably, the drowsiness signal may be derived mostly or solely from the characteristic pattern. In this case, the characteristic pattern is selected as main basis for determining the drowsiness signal. However, if the frame rate is not high enough for extracting or recognizing the characteristic pattern reliably, the activity level may be selected as the main basis for determining the drowsiness signal. In this case, the confidence level assigned to the characteristic pattern may also have a low value due to the reduced frame rate.

The confidence level assigned to the characteristic pattern to the characteristic pattern may be related to assessing the ability for recognizing the characteristic pattern within the image sequence. A standard error calculation may be applied to a pattern recognition procedure which extracts the characteristic pattern from the image sequence.

Similarly, the confidence level assigned to the activity level may depend on the ability for recognizing a predetermined activity of the driver within the image sequence. Moreover, the availability and the quality of the sensor's output signal may be considered when determining the confidence level assigned to the activity level. For example, if speech activity of the driver may be determined clearly in the output signal of a microphone, a high confidence level may be assigned to the activity level.

The respective confidence levels may also depend on the quality of respective signals on which the characteristic pattern and the activity level rely, e.g. on their signal to noise ratio. The confidence levels may be used to define, together with or as an alternative to the frame rate of the camera system, weights for selecting the characteristic pattern, and/or the activity level as basis for determining the drowsiness signal.

In summary, a reliable drowsiness signal can be provided regardless of the operation modes of the camera system which may provide different frame rates for the image sequence. The method according to the disclosure overcomes the problems regarding reliability or even missing availability of the detected drowsiness due to the reduced frame rate e.g. if the camera system is involved in a further vehicle process like a video call.

According to an embodiment, determining the activity level of the driver from the image sequence may include recognizing a movement pattern of the driver in the image sequence and deriving the activity level from the movement pattern. The movement pattern may be the same as the characteristic pattern which is directly indicative of drowsiness of the driver, or it may be different from the characteristic pattern. However, if the movement pattern and the characteristic pattern are identical, e.g. based on the driver's eye opening dynamics, the algorithm for determining the activity level based on this pattern may be different from the algorithm for determining the drowsiness signal directly based on the pattern. For example, the algorithm for determining the activity level may be operable at a low frame rate at which the direct determination of the drowsiness signal from the characteristic pattern may not reliable any more.

Moreover, the movement pattern may be associated with a predefined facial region of the driver from which, for example, it may be determined whether the driver is speaking. Additionally or alternatively, the movement pattern may rely on the eye region or the eye gaze and/or head pose dynamics of the driver. Moreover, the movement pattern may be related to changes of the body position and posture of the driver. If the movement pattern is used for deriving the activity level, the same image sequence may be used for this determination as for extracting the characteristic pattern. Hence, the effort for performing the method may be reduced since the image sequence has to be captured only once.

For example, the movement pattern may be related to a movement of the driver's mouth, and the driver's activity level may be determined based on the movement of the driver's mouth. For example, a frequency of mouth openings may be used as a measure of activity. Therefore, for this embodiment it may be determined reliably whether the driver is speaking and active. The drowsiness signal may be reduced accordingly if driver activity due to speaking may be determined, and conversely increased if no speaking activity can be detected.

According to a further embodiment, determining the driver's activity level from the output signal provided by the sensor of the vehicle may include receiving a signal of a microphone in the proximity of the driver and determining the driver's activity level based on the signal of the microphone. Therefore, the microphone signal may be used as a reliable indicator of the driver's activity. Hence, the effort for performing the method may be reduced if the microphone signal is involved.

The characteristic pattern may be associated with a predefined facial region and/or with a change of a body posture of the driver. This embodiment provides flexibility regarding the region in which the characteristic pattern is monitored. Therefore, the flexibility of the method is enhanced.

Moreover, a drowsiness signal trend may be derived from the image sequence, and the drowsiness signal may be determined by additionally considering the drowsiness signal trend. This trend may include increasing or decreasing an actual drowsiness signal with respect to the drowsiness signal determined previously, or to leave the actual drowsiness signal stationary. The change of the actual drowsiness signal may define the drowsiness signal trend. Hence, this trend may be determined from a plurality of points in time or image frames. Therefore, a "drowsiness history" may also be considered for this embodiment.

According to a further embodiment, the camera system may be configured to operate in a high frame rate mode with a predetermined rate of image frames, or in a low frame rate mode with a reduced rate of image frames which is lower than the predetermined rate. If the camera system is operating in the high frame rate mode, the drowsiness signal may be determined based on the extracted characteristic pattern, and if the camera system is operating in the low frame rate mode, the drowsiness signal may be determined based on the activity level.

Hence, the drowsiness signal may be determined regardless of the mode of the camera system, e.g. for the high and low frame rate modes. In the high frame rate mode, the camera system may be operating at the predetermined rate of image frames which means that a sampling rate for the images is high enough for reliably detecting drowsiness based on the image sequence.

In the low frame rate mode, however, which is related to the camera system operating at a reduced rate of image frames or sampling rate, the reliability of a drowsiness signal derived from the characteristic pattern may be drastically reduced. The reduced rate of image frames of the camera system may be caused by another process which may be performed in the vehicle, e.g. by an infotainment system, in addition to monitoring the driver via the camera system. For example, a video call may be initiated by the infotainment system such that the camera system may be used for projecting a video, e.g. in a rear mirror of the vehicle. Other reasons for the reduced rate of image frames may be e.g. power savings or thermal degradation.

In the low frame rate mode, the drowsiness signal may be related to the activity level due to the reduced reliability of determining drowsiness based on the characteristic pattern when the reduced rate of image frames or sampling rate of the camera system is available only. For example, a low driver drowsiness may be detected if a high activity level of the driver is determined, and a high driver drowsiness may be detected if a low activity level of the driver is present. Moreover, the drowsiness signal may be initialized by a predefined value and updated by considering the activity level. Hence, the reliability of the drowsiness signal may be improved if the camera system is operating with the reduced rate of image frames.

If the camera system is operating in the low frame rate mode, a base signal may be determined based on the extracted characteristic pattern, and the drowsiness signal may be determined by means of a parametrizable function depending from the base signal and from the activity level. That is, the base signal may be determined in the same manner as the drowsiness signal for the high frame rate mode, in spite of lower frame rate which may be too low for a reliable drowsiness signal. The base signal may be used as an initial parameter which is mapped to the drowsiness via the parametrizable function.

For example, the parametrizable function may depend on a learning rate, a previous drowsiness signal and the base signal. The learning rate may depend on the activity level and on a difference between the previous drowsiness signal and the base signal. The previous drowsiness signal may be the result of a previous drowsiness detection or a predetermined default value. The use of the learning rate, the previous drowsiness signal, and the base signal for determining the drowsiness signal may be one example how the base signal may be modified for finally ending up with the drowsiness signal. Since the previous drowsiness signal and the learning rate are considered, a "drowsiness history" may influence the drowsiness signal, which may increase its reliability.

The parametrizable function may either be identical for all drivers or may be customized with respect to the individual driver. That is, the individual driver may be identified by using the camera system and a recognition system or by another suitable identification method. For the individual driver, a drowsiness profile comprising individual parameters for the parametrizable function may be generated and stored in a database which therefore may include historic drowsiness data in form of the drowsiness profile assigned to the respective driver.

For example, if it is known that the drowsiness state changes quite rapidly for the respective driver, a high value for the learning rate may be applied. Moreover, different functions may be applied to different drivers and customized by a learning process based on previous drowsiness data and activity levels. In addition, the relationship between the individual activity level and the actual drowsiness may be established and checked based on historic drowsiness and activity data, e.g. the individual drowsiness profile, being stored in the database.

Furthermore, the base signal may be used as an initial value which may be modified in accordance with the activity level in order to determine the drowsiness signal. In addition, determining the drowsiness signal by modifying the base signal in accordance with the activity level may include that a rate of an increase and a rate of a decrease with respect to the base signal may depend on the activity level. In other words, the speed for modifying the base signal may be adapted to the activity level.

For example, if a high activity level is determined, the base signal may be decreased with a high rate, while the base signal may be increased with a high speed if almost no activity of the driver may be determined. Therefore, the reliability of the drowsiness signal may be improved due to the flexible rate for modifying or adapting the base signal in dependence of the activity level.

The base signal may be determined based on mapping the characteristic pattern to the base signal by using a machine learning algorithm. The machine learning algorithm may include a neural network. Since the machine learning algorithm may require a learning process in which the resulting base signal may be related to a known drowsiness condition of the driver represented by the characteristic pattern being extracted from the image sequence, the accuracy of the method may be improved during the learning process of the machine learning algorithm.

According to a further embodiment, the characteristic pattern may be associated with a movement of eye lids of the driver, and if the camera system is operating in the high frame rate mode, the drowsiness signal may be determined based on an eye opening, and/or an eye blink frequency which may be determined from the movement of the driver's eye lids. Generally, the driver's eye region may provide reliable indicators for drowsiness of the driver. Hence, monitoring the movement of the driver's eye lids may lead to a robust and reliable method.

According to another embodiment, the camera system may be operated in the low frame rate mode if the camera system is involved in an internal vehicle process which reduces the rate of image frames being available for monitoring the driver. The internal vehicle process may include a video call. Alternatively or additionally, the internal vehicle process may be related to power savings and/or thermal degradation of another vehicle component which may be directly or indirectly connected to the camera system. For this embodiment, the camera system may enter the low frame rate mode only if the internal vehicle process actually requires switching into the low frame rate mode. Conversely, the low frame rate mode may not be entered arbitrarily without any need. Hence, the reliability of the method may further be improved.

If the camera system is operated in the low frame rate mode and the processing unit fails in determining the drowsiness signal based on the activity level, the camera system may be switched to the high frame rate mode and the internal vehicle process may deactivated. If the processing unit has successfully determined the drowsiness signal in the high frame rate mode thereafter, the camera system may be switched into the low frame rate mode again in order to continue the internal vehicle process like a video call. By this means, a trade-off may be achieved between providing a reliable drowsiness signal for improving the safety of the vehicle and providing an internal vehicle process without interruption.

If the internal vehicle process includes a video call, the activity level may be determined by monitoring an engagement of the driver during the video call. The driver's engagement during the video call may be determined e.g. by monitoring his language activity. This may be determined by tracing feature points on the driver's mouth contour and by determining changes of their relative positions, by a mouth opening classification, and/or by analyzing a signal of a microphone associated to the driver. In addition, changes of the driver's body position and/or posture may be detected based on the image sequence in order to assess the driver's engagement during the video call. Moreover, the driver's eye gaze and head pose dynamics may also be monitored based on the image sequence.

An engagement score may be established for the driver which is increased if at least one input signal is available indicating that the driver is engaged in a video call, and which is decreased if the input signal indicates that the driver shows a sparse or almost no engagement. The activity level may be derived directly from the engagement score, e.g. there may be a direct relationship or mapping between the engagement score and the activity level.

According to a further embodiment, a set of vehicle parameters may be received by the processing unit, and operating the camera system in the low frame rate mode may be disabled if one of the set of vehicle parameters is greater than a predefined threshold. The set of vehicle parameters may include the vehicle speed, a traffic condition, and/or a current vehicle operation mode, e.g. whether the vehicle is operated automatically or manually. For example, a video call or another process of an infotainment system may be disabled or stopped if one of the vehicle parameters exceeds the predefined threshold, which also disables a transition into a low frame rate mode for the camera system. In other words, the vehicle condition may not allow to perform a further internal vehicle process like a video call such that the frame rate for monitoring the driver may be maintained at the predetermined rate of image frames.

Furthermore, the set of vehicle parameters may allow that the detection of the driver's drowsiness may be performed with a reduced priority. For example, if the vehicle is stopped or driving at low speed e.g. in a traffic jam, it may be sufficient to detect the driver's drowsiness based on an image sequence being captured at the reduced rate of image frames. In this case, characteristics like eye opening or viewing direction may be used in order to determine the drowsiness signal in this case.

In another aspect, the present disclosure is directed at a computer system, said computer system being configured to carry out several or all operations of the computer implemented method described herein.

The computer system may comprise a processing unit, at least one memory unit and at least one non-transitory data storage. The non-transitory data storage and/or the memory unit may comprise a computer program for instructing the computer to perform several or all operations or aspects of the computer implemented method described herein.

As used herein, the terms processing unit and module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

The processing unit of the computer system may include a drowsiness estimation module and an activity estimation module. The drowsiness estimation module may be configured to extract the characteristic pattern of the driver in the image sequence captured by the camera system, and to determine the base signal based on the extracted characteristic pattern. The drowsiness estimation module may further be configured to determine whether the camera system is operating in the high frame rate mode or in the low frame rate mode. If the camera system is operating in the high frame rate mode, the drowsiness estimation module may output the drowsiness signal being determined based on the extracted characteristic pattern.

The activity estimation module may be configured to determine the driver's activity level from the image sequence provided by the camera system and/or from an output signal provided by a sensor of the vehicle. If the camera system is operating in the low frame rate mode, the drowsiness estimation module may be further configured to determine the drowsiness signal by modifying the base signal in accordance with the activity level and to output the drowsiness signal.

The camera system may include a camera, e.g. an RGB-IR camera, a camera controller, and a camera mode manager. The camera mode manager may be configured to select the high frame rate mode or the low frame rate mode of the camera system based on a vehicle system context, e.g. based on information provided by a vehicle infotainment system. The camera controller may be configured to operate the camera in the high frame rate mode with the predetermined rate of image frames or in the low frame rate mode with a reduced rate of image frames being lower than the predetermined rate. In addition, the camera controller may be configured to provide the image sequence for the drowsiness estimation module and the activity estimation module of the processing unit.

In another aspect, the present disclosure is directed at a vehicle which includes the computer system and the camera system as described above.

In another aspect, the present disclosure is directed at a non-transitory computer readable medium comprising instructions for carrying out several or all operations or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer implemented method described herein.

BRIEF DESCRIPTION OF THE DRAWINGS

Example embodiments and functions of the present disclosure are described herein in conjunction with the following drawings, showing schematically.

DETAILED DESCRIPTION

Figure 1:
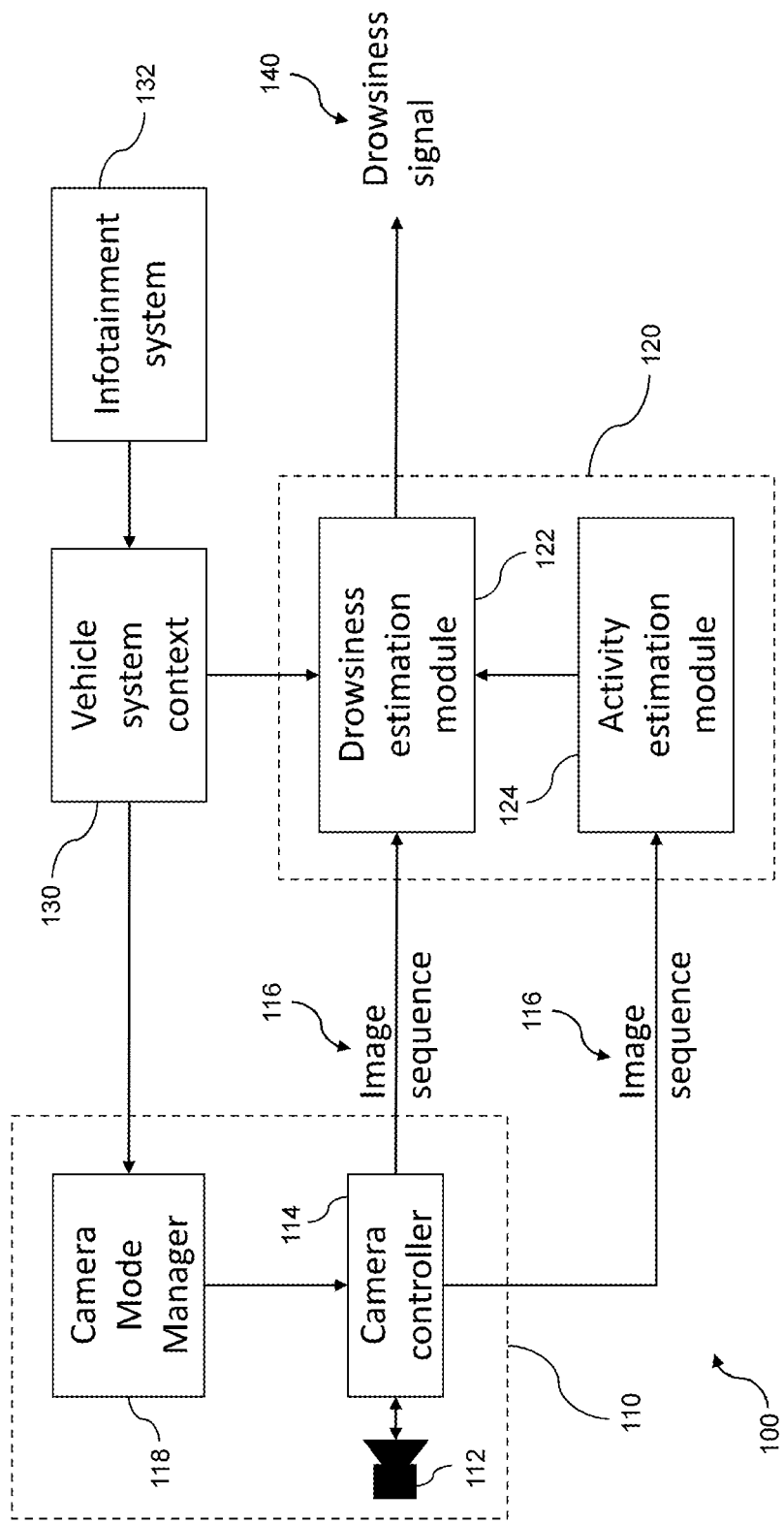
FIG. 1 illustrates a system for detecting drowsiness of a driver according to the disclosure.

The present disclosure relates to a method for determining drowsiness of a driver in a vehicle. FIG. 1 schematically depicts a system 100 for detecting drowsiness of a driver in a vehicle (not shown). The system 100 includes a camera system 110 and a processing unit 120.

The camera system 110 includes a camera 112 which is configured as an RGB-IR camera such that the camera 112 is able to capture RGB colour images as well as IR images in the infrared range of the electromagnetic spectrum. The camera system 110 further includes a camera controller 114 which is in communication with the camera 112. The camera controller 114 configures settings for the camera 112 and acquires images which are captured by the camera 112. In addition, the camera controller 114 provides image sequences 116 to the processing unit 120, e.g. to a drowsiness estimation module 122 and an activity estimation module 124 of the processing unit 120.

Furthermore, the camera system 110 includes a camera mode manager 118 which determines an operation mode for the camera 112 which is set by the camera controller 114. For determining the operation mode of the camera 112, the camera mode manager 118 receives a vehicle system context 130, e.g. information provided by further components and software of the vehicle. The vehicle system context 130 includes data provided by an infotainment system 132 of the vehicle.

The data provided by the infotainment system 132 includes information about vehicle processes in which the camera 112 may be involved or which may require images or image sequences provided by the camera 112. One example for such a vehicle process is a video call being established by the infotainment system 132. The video call may request that the camera 112 displays a video, e.g. in the region of a rear mirror of the vehicle.

The camera 112 is installed inside a cabin of the vehicle (not shown) and has an instrumental field of view including one or more occupants of the vehicle. As such, the field of view of the camera 112 covers the driver's head and torso region in order to monitor the driver regarding drowsiness.

When determining the operation mode for the camera 112, the camera mode manager 118 specifies whether the camera 112 is operated in an infrared mode being optimized for computer vision, or in a colour or RGB mode optimized for human vision, or both. In addition, the camera mode manager 118 specifies whether the camera 112 and therefore the entire camera system 110 operates in a high frame rate mode in which the camera 112 monitors the driver of the vehicle with a predetermined rate of image frames which constitute the image sequence 116. In the high frame rate mode, the only task of the camera 112 is capturing image frames of the interior of the vehicle. The image frames show one or more occupants of the vehicle, e.g. at least the driver.

Since in the high frame rate mode the camera 112 captures the image frames of the vehicle occupants only and is not involved in further tasks or processes, the camera 112 operates at a high predetermined frame rate in the high frame rate mode. For example, the frame rate of the high frame rate mode may be greater than 45 frames per second and is typically about 60 frames per second.

The vehicle system context 130 further includes, e.g. in addition to the data provided by the infotainment system 132, information regarding the vehicle speed, regarding the traffic condition for the vehicle, and the current vehicle operation mode, for example, e.g. whether the vehicle is driven manually or automatically.

The vehicle system context 130 provides information to the camera mode manager 118 including a request to involve the camera 112 in a further task or process of the vehicle, e.g. in addition to capturing image frames from the vehicle's occupants. If the camera mode manager 118 receives such a request to involve the camera 112 in an additional process of the vehicle, e.g. a request to display a video associated with a video call, the camera mode manager 118 establishes a low frame rate mode for the camera 112 in which the camera 112 performs both tasks, e.g. capturing image frames for monitoring the driver and the further task requested by the vehicle system context 130, e.g. the task to display a video as part of a video call.

Due to the additional task for the camera 112 being requested by the vehicle system context 130, the camera system 110 is able to monitor the driver with a reduced rate of image frames only in the low frame rate mode, wherein the reduced rate of image frames is lower than the predetermined rate, e.g. lower than a required frame rate of about 45 frames per second.

The drowsiness estimation module 122 of the processing unit 120 receives the image sequence 116 from the camera controller 114 regardless of the mode of the camera 112. The drowsiness estimation module 122 applies an algorithm to the image sequence 116 in order to extract a characteristic pattern of the driver from the image sequence 116 captured by the camera 112, wherein the characteristic pattern is indicative of drowsiness of the driver. If the camera system is operating in the high frame rate mode, the drowsiness estimation module 122 determines a drowsiness signal 140 based on the extracted characteristic pattern. The drowsiness signal 140 provides an estimation for a drowsiness level of the driver. Any signal which is derived from the characteristic pattern may also be regarded as measured drowsiness or measured drowsiness signal.

For example, the characteristic pattern is associated with movement of the driver's eyes. Based on the movement of the driver's eyes, the drowsiness estimation module 122 may determine, for example, a blink frequency for the driver which indicates his drowsiness level. More details for determining the measured drowsiness signal will be provided below in context of FIG. 2.

If the camera system 110 is operating in the high frame rate mode of monitoring the driver only at the predetermined high rate of image frames, the measured drowsiness signal estimated by the drowsiness estimation module 122 is regarded as reliable due to the high rate of image frames. Therefore, the measured drowsiness signal is output as the drowsiness signal 140 by the processing unit 120 in the high frame rate mode.

If the camera system 110 is operating in the low frame rate mode of performing an additional task via the camera 112, e.g. in addition to monitoring the driver, at the reduced rate of image frames, the drowsiness signal derived from the characteristic pattern may not reliably represent the actual drowsiness level of the driver. For example, the reduced rate of image frames may be too low for assessing the driver's eye movements, e.g. by determining the blink frequency. Therefore, in the low frame rate mode the drowsiness estimation module 122 determines the drowsiness signal 140 by considering additional information provided by the activity estimation module 124. For example, drowsiness estimation module 122 uses the measured drowsiness signal derived from the characteristic pattern as an initial value only, e.g. as a base signal, and modifies this signal in accordance with the input of the activity estimation module 124.

The activity estimation module 124 also receives the image sequence 116 from the camera controller 114. From the image sequence 116, the activity estimation module 124 determines an activity level of the driver. Alternatively or additionally, the activity estimation module 124 may receive an output signal provided by a sensor of the vehicle, e.g. from a microphone (not shown) installed in the vehicle. The activity estimation module 124 may also determine the activity level of the driver based on this output signal provided by the sensor. If the information provided by the activity estimation module 124, e.g. the activity level of the driver, is provided to the drowsiness estimation module 122 in the low frame rate mode as mentioned above, the drowsiness estimation module 122 modifies the measured drowsiness or base signal in accordance with the activity level provided by the activity estimation module 124 in order to determine and output the drowsiness signal 140 based on this modification. As an alternative, the drowsiness estimation module 122 may determine the drowsiness signal 140 by processing the information of the activity estimation module 124 only, e.g. by mapping an activity level 234 (see FIG. 2) to the drowsiness signal 140 without considering the measured drowsiness signal derived from the characteristic pattern.

Figure 2:
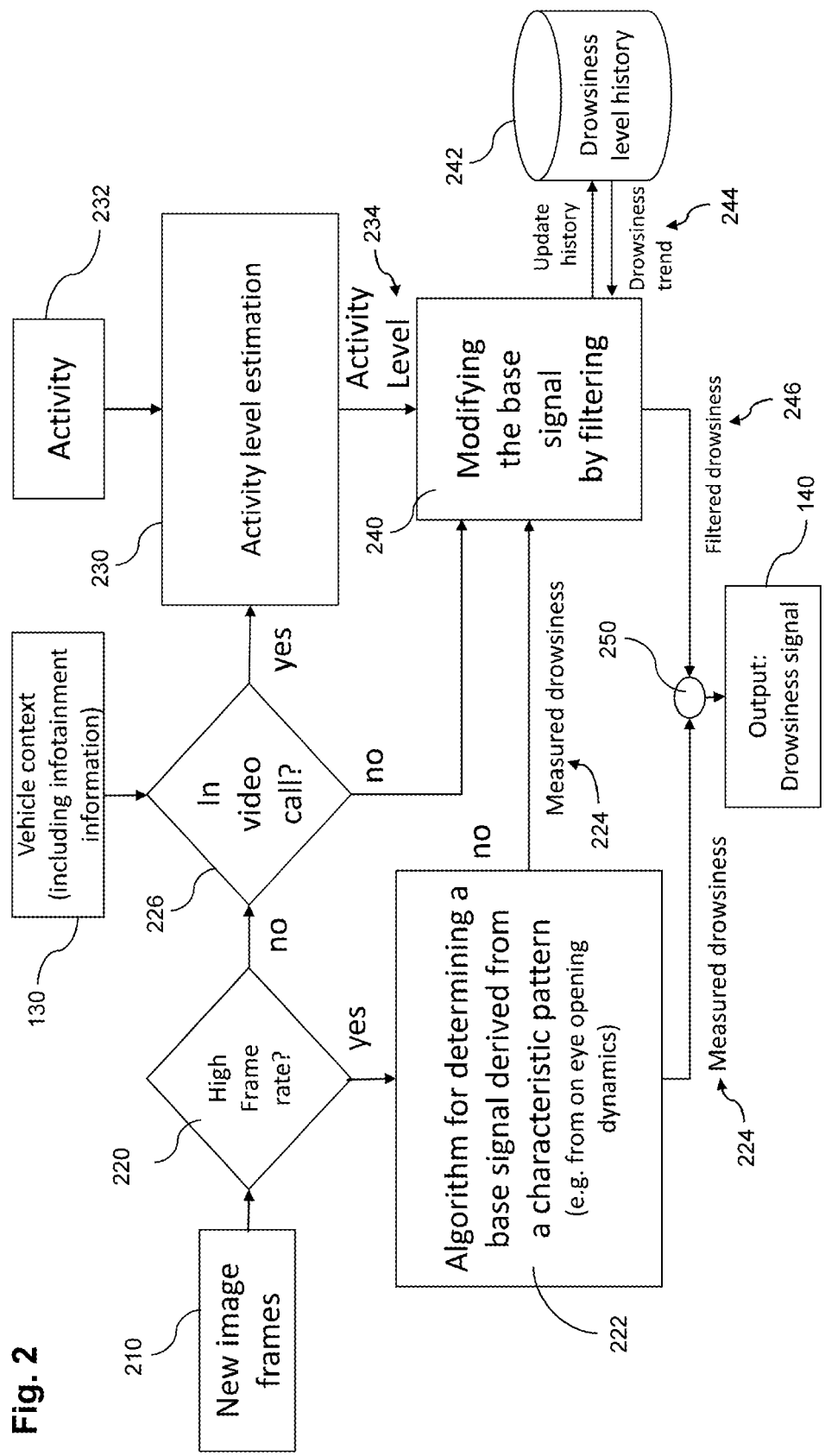
FIG. 2 illustrates a detailed illustration of a drowsiness detection according to the disclosure.

FIG. 2 depicts a flow diagram illustrating details of the drowsiness detection performance by the drowsiness estimation module 122 and the activity estimation module 124 of the processing unit 120 (see FIG. 1). At 210, new image frames are provided, e.g. as the image sequence 116, by the camera controller 114.

At 220, it is determined whether the new image frames provided at 210 have a high frame rate, e.g. a frame rate above a predetermined threshold of e.g. 45 frames per second. Such a predetermined frame rate is sufficient for determining e.g. the blink frequency of the driver's eyes with sufficient reliability. If it is determined at 220 that the frame rate of the new image frames is greater than the predetermined threshold, at 222 an algorithm for determining a base signal is applied to the new image frames captured at 210, e.g. to the image sequence 116 as shown in FIG. 1. The algorithm for determining the drowsiness signal which is represented by block 222 is performed by the drowsiness estimation module 122.

Since the base signal directly relies on captured or measured image frames provided at 210, the base signal may also be referred to as measured drowsiness 224. The term "base" is used is this context since this signal may also be used as a base or initial signal in the low frame rate mode described below, e.g. if the frame rate of the image sequence is below the predetermined threshold.

If a high frame rate is determined for the image frames at 220, the camera system 110 is operating in the high frame rate mode of monitoring the driver only without additional tasks requested by the vehicle system context 130. Therefore, the base signal is regarded as reliably representing the driver's actual drowsiness, and the base signal is output at 250 as the drowsiness signal 140.

The base signal is determined from eye opening dynamics of the driver, for example. In the respective new image frames provided at 210, e.g. within the image sequence 116, the region of the driver's eyes is identified, and thereafter e.g. the blink frequency of the driver's eyes and/or an opening status of the driver's eyes is determined.

The movements of the driver's eye lids may be one example for the characteristic pattern indicative of drowsiness of the driver which is recognized in the image sequence 116. The characteristic pattern, e.g. the movement of the driver's eye lids, can be directly mapped to the base signal, e.g. by a machine learning algorithm. For example, if a high eye blinking frequency is derived from the characteristic pattern provided by the image sequence 116, it can be assumed that the driver has a low drowsiness level, and a low base signal is provided.

Drowsiness signals, e.g. the base signal and the drowsiness signal 140, may represent a probability of the driver's drowsiness. That is, a drowsiness signal of almost 0 indicates that the driver is most probably not drowsy at the moment, whereas a high drowsiness signal of about 1 may indicate that the driver is most likely in a drowsy condition requiring a reaction of the system, e.g. a warning and/or an adaptation of further vehicle systems.

For determining the base signal, further input signals may be considered which may also be provided by the image sequence 116 and/or by other vehicle systems. For example, a yawning detection may be performed and/or the movements of the driver's head may be monitored, e.g. in addition to the dynamics of the driver's eyes.

Conversely, if it is determined at 220 that the image frames are not provided with the high frame rate, the camera system 110 is operating in the low frame rate mode at a reduced frame rate being lower than the predetermined high frame rate. In other words, the frame rate of the image frames is below a threshold of e.g. 45 frames per second if the camera system 110 is operating in the low frame rate mode. If no high frame rate is determined at 220, it is determined at 226 whether e.g. a video call is performed due to the vehicle context 130, e.g. due to a request by an infotainment system 132 of the vehicle. In detail, it is determined at 226 whether the driver is involved in the video call. Instead of a video call, other processes performed in the vehicle may be regarded at 220 as long as such processes may be accompanied by involvement or engagement of the driver.

The video call may be available in different variants depending on the driving mode of the vehicle. In a manual driving mode, the video call may be available for other occupants only, e.g. by using individual screens, but it may not be visible for the driver. Hence, for the driver this may be like a normal phone call with the difference that other participants can optionally see the driver through the camera, but the driver does not see the other participants of the call. However, even if the video call is acquired for the other occupants than the driver, the frame rate of the camera system 110 will drop, and the determination of the driver's drowsiness will therefore be affected or even deteriorated.

With higher automation levels of the driving, it may be allowed to enable the display also for the driver to see the other participants of the video call and keep the eyes off road for some time. In such a driving mode, cues like "looking at screen or camera" may be used as a measure of the driver's engagement and his activity level as a basis for determining the drowsiness signal 140. That is, the detailed conditions may change for different driving modes, but the overall concept for determining the drowsiness signal 140 will remain the same as described herein. For example, features like language detection or generic body activities are relevant for all driving modes when determining the driver's drowsiness.

As long as the driving mode is not a fully automated mode (L5), determining the driver's drowsiness will remain relevant since it has to be monitored whether the driver is either frequently checking the traffic (L3) or able to come back upon request after some secondary task (L4). As one variant, the video call may be available in a certain driving mode only for which "eyes off road" are allowed.

If it is determined at 226 that the driver is involved in a video call or in another process provided by the vehicle context 130, an activity level estimation is performed at 230 by the activity estimation module 124 (see FIG. 1). That is, an activity 232 is detected by the activity estimation module 124 based on the image sequence 116 and/or based on a signal of a further vehicle sensor, e.g. a signal of a microphone associated with the driver.

For example, the activity 232 of the driver is detected by determining whether the driver is currently speaking. This can be determined e.g. based on mouth movements of the driver. For example, changes of relative positions of predefined feature points on the mouth contour may be determined from the image sequence 116, or the mouth opening may be classified by monitoring the driver's mouth in the image sequence 116. Additionally or alternatively, a microphone associated with or being located in the proximity of the driver may be used for determining whether the driver is speaking. In this case, a microphone signal is provided to the activity estimation module 124.

In this case, the driver's activity level is determined based on a language or speech pattern of the driver. In addition, the frequency of the microphone signal may be monitored for identifying a current speaking cadence of the driver. The current speaking cadence may be compared with a known speaking cadence of the driver being stored in a database of the vehicle which is associated with the activity estimation module 124. The known speaking cadence may be part of a stored personal profile of the driver. Based on such a comparison of the current and the known speaking cadences, activity estimation module 124 can assess the driver's activity level.

Moreover, the eye gaze and head pose dynamics as well as body position and posture changes of the driver may be considered for detecting the driver's activity. For example, it is determined based on the image sequence 116 whether the driver's view is directed at the road in front of the vehicle or at the camera and/or the display providing information regarding the video call. For every view at a region relevant for the video call, e.g. every corresponding change of the direction of the driver's view, the activity estimation module 124 may increment the activity level.

Via the camera system 110, a time period may also be determined for which the driver's gaze direction is not directed at the road. If this time period is too long, a warning may be provided. However, if the vehicle is able to be driven automatically, e.g. in case of autonomous driving, the driver may be allowed to take his gaze direction away from the road permanently and to attend the video call with full attention. For this scenario, the activity estimation module 124 determines the activity level by assessing the driver's engagement during the video call, e.g. based on monitoring the driver's mouth and/or the signal of the microphone associated with the driver.

The activity level represents a probability of the driver being in an active condition. Accordingly, a score may be defined for the activity level which is close to 1 if an intense activity of the driver can be detected and which is close to 0 if almost no activity of the driver is present.

The activity estimation module 124 (see FIG. 1) provides the activity level 234 to the drowsiness estimation module 122. For the present embodiment, the drowsiness estimation module 122 determines the base or measured drowsiness 224 as described above although this signal may not reliably represent the driver's actual drowsiness. Alternatively, a "historic" drowsiness signal may be retrieved from a database 242 in which a drowsiness profile of the driver may be stored.

In order to determine a reliable drowsiness signal, the drowsiness estimation module 122 modifies the base signal 224 at 240 by applying a special filtering process. The base signal 224 is modified by considering the activity level 234 in order to provide the drowsiness signal 140. In detail, modifying the base signal 224 is performed according to the following formula:

$$\text{Updated drowsiness signal} = \alpha(\text{activity level}, \text{previous drowsiness signal} - \text{base signal})*\text{base signal} + (1-\alpha)*\text{previous drowsiness signal}$$

$\alpha$ is a learning rate which depends on the activity level and on the change of the drowsiness signal, e.g. the difference between the previous drowsiness signal and the currently measured base signal 224. The previous drowsiness signal is either a previous drowsiness signal 140 determined in a previous time step or a default value which are both stored in the database 242 as a drowsiness level history. That is, the data base for the drowsiness level history 242 is updated each time when the drowsiness signal 140 is determined.

In addition, a drowsiness trend 244 can be derived from the database 242 representing the drowsiness level history by considering more than one timestep. The drowsiness trend 244 can be additionally considered for the modification of the base signal, e.g. for defining the increase or decrease of the base signal.

It is noted that the formula provided above or a similar formula can be regarded as a digital filter applied to the base signal 224. Hence, the drowsiness estimation module 122 provides a filtered drowsiness or filtered drowsiness signal 246 if the camera system 110 is operating in the low frame rate mode at the reduced frame rate.

If it is determined at 226 that the driver is not involved in a video call or another process provided by the vehicle context 130, the base signal or measured drowsiness 224 is also modified in a similar manner as described above, but without considering the activity level 234 when determining the learning rate a. That is, the drowsiness level history 242 is also taken into account, e.g. the previous drowsiness signal and/or the drowsiness trend 244, when modifying the base signal 224 and providing the filtered drowsiness signal 246.

At 250, it is selected based on the operation mode of the camera system 110 whether the measured drowsiness or base signal 224 or the filtered drowsiness signal 246 is provided as the drowsiness signal 140. That is, if the camera system 110 is operating in the high frame rate mode, the measured drowsiness or base signal 224 is provided as the drowsiness signal 140. If the camera system 110 is operating in the low frame rate mode with the reduced frame rate, the modified or filtered drowsiness signal 246 is provided as the drowsiness signal 140.

The drowsiness signal 140 is used by further systems of the vehicle. For example, if the drowsiness signal 140 exceeds a predefined threshold, an alert may be provided within the vehicle. Additionally, functions of an advanced driver assistance system (ADAS) are adapted if the drowsiness signal 140 exceeds the threshold such that the vehicle will brake sooner, keep a larger distance to other vehicles and is provided with a lower warning threshold associated with the advanced driver assistance system.

Figure 3:
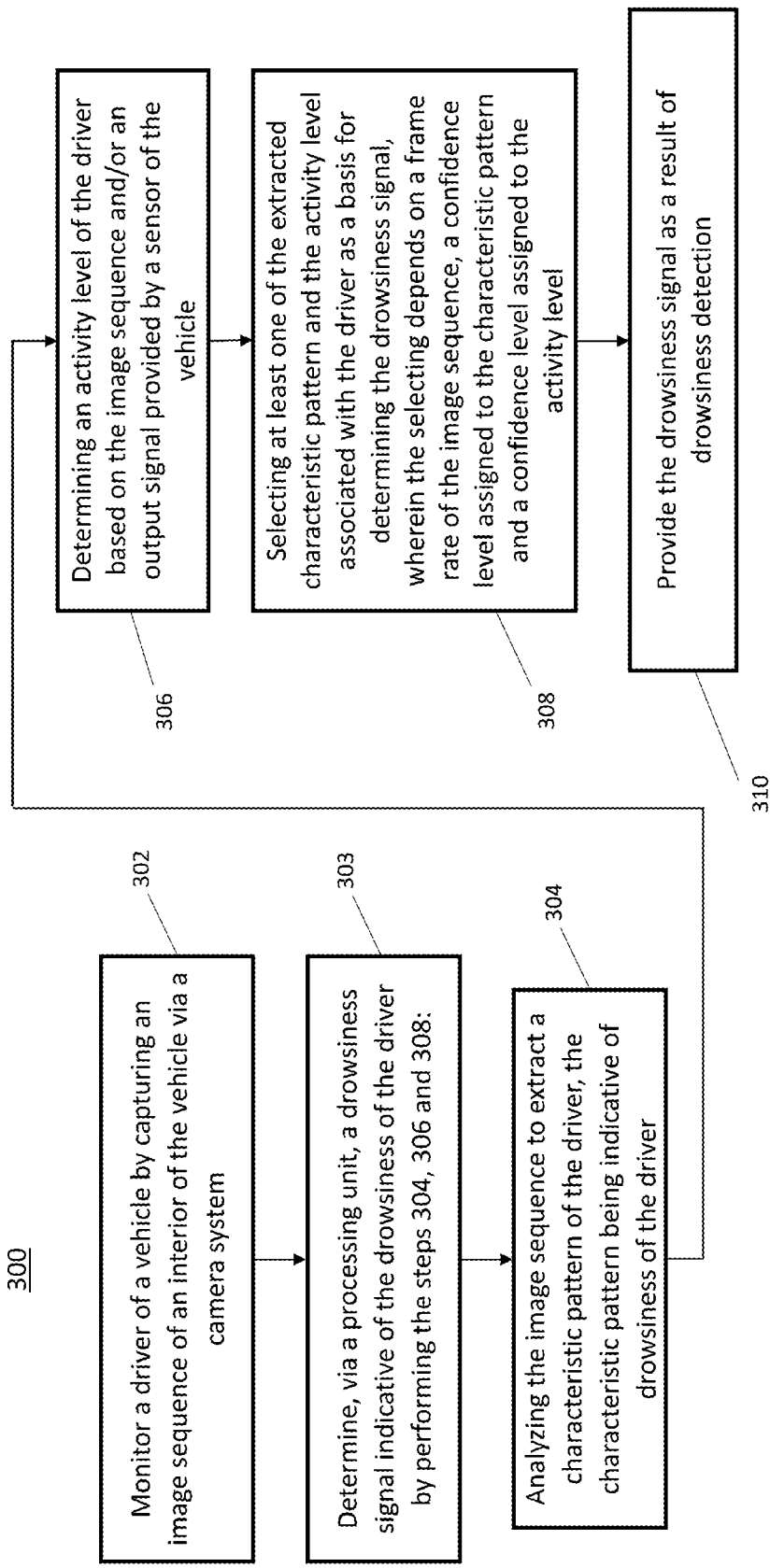
FIG. 3 illustrates a flow diagram illustrating a method for detecting drowsiness of a vehicle driver according to various embodiments.

FIG. 3 shows a flow diagram illustrating a method 300 for determining drowsiness of a driver in a vehicle according to various embodiments. At 302, the driver may be monitored by capturing an image sequence of an interior of the vehicle via a camera system. As represented by 303, a drowsiness signal indicative of the drowsiness of the driver may be determined via a processing unit by performing the operations 304, 306 and 308. At 304, the image sequence captured by a camera system may be analyzed via a processing unit to extract a characteristic pattern of the driver, wherein the characteristic pattern may be indicative of drowsiness of the driver. At 306, an activity level of the driver may be determined based on the image sequence and/or an output signal provided by a sensor of the vehicle. At 308, at least one of the extracted characteristic pattern and the activity level associated with the driver may be selected as a basis for determining the drowsiness signal, wherein the selecting depends on a frame rate of the image sequence, a confidence level assigned to the characteristic pattern and/or a confidence level assigned to the activity level. At 310, the drowsiness signal may be provided as a result of drowsiness detection.

According to various embodiments, determining the driver's activity level from the image sequence may include: recognizing a movement pattern of the driver in the image sequence, and deriving the activity level from the movement pattern.

According to various embodiments, the movement pattern may be associated with a predefined facial region of the driver.

According to various embodiments, determining the driver's activity level from the output signal provided by the sensor of the vehicle may include: receiving a signal of a microphone in the proximity of the driver, and determining the driver's activity level based on the signal of the microphone.

According to various embodiments, the characteristic pattern may be associated with a predefined facial region and/or with a change of a body posture of the driver.

According to various embodiments, a drowsiness signal trend may be derived from the image sequence, and the drowsiness signal may be determined by additionally considering the drowsiness signal trend.

According to various embodiments, the camera system may be configured to operate in a high frame rate mode with a predetermined rate of image frames, or in a low frame rate mode with a reduced rate of image frames which is lower than the predetermined rate. If the camera system is operating in the high frame rate mode, the drowsiness signal may be determined based on the extracted characteristic pattern, and if the camera system is operating in the low frame rate mode, the drowsiness signal may be determined based on the activity level.

According to various embodiments, if the camera is operating in the low frame rate mode, a base signal may be determined based on the extracted characteristic pattern, and the drowsiness signal may be determined by means of a parametrizable function depending from the base signal and from the activity level.

According to various embodiments, the characteristic pattern may be associated with a movement of eye lids of the driver, and if the camera system is operating in the high frame rate mode, the drowsiness signal may be determined based on an eye opening and/or an eye blink frequency which may be derived from the movement of the driver's eye lids.

According to various embodiments, the camera may be operated in the low frame rate mode if the camera system is involved in an internal vehicle process which reduces the rate of image frames being available for monitoring the driver.

According to various embodiments, if the camera system is operated in the low frame rate mode and the processing unit fails in determining the drowsiness signal based on the activity level, the camera system is switched to the high frame rate mode and the internal vehicle process is deactivated.

According to various embodiments, the internal vehicle process may include a video call, and the activity level may be determined by monitoring an engagement of the driver during the video call.

According to various embodiments, a set of vehicle parameters may be received by the processing unit, and operating the camera in the low frame rate mode may be disabled if one of the set of vehicle parameters is greater than a predefined threshold.

Each of the operations 302, 303, 304, 306, 308, and 310 and the further operations described above may be performed by computer hardware components.

Figure 4:
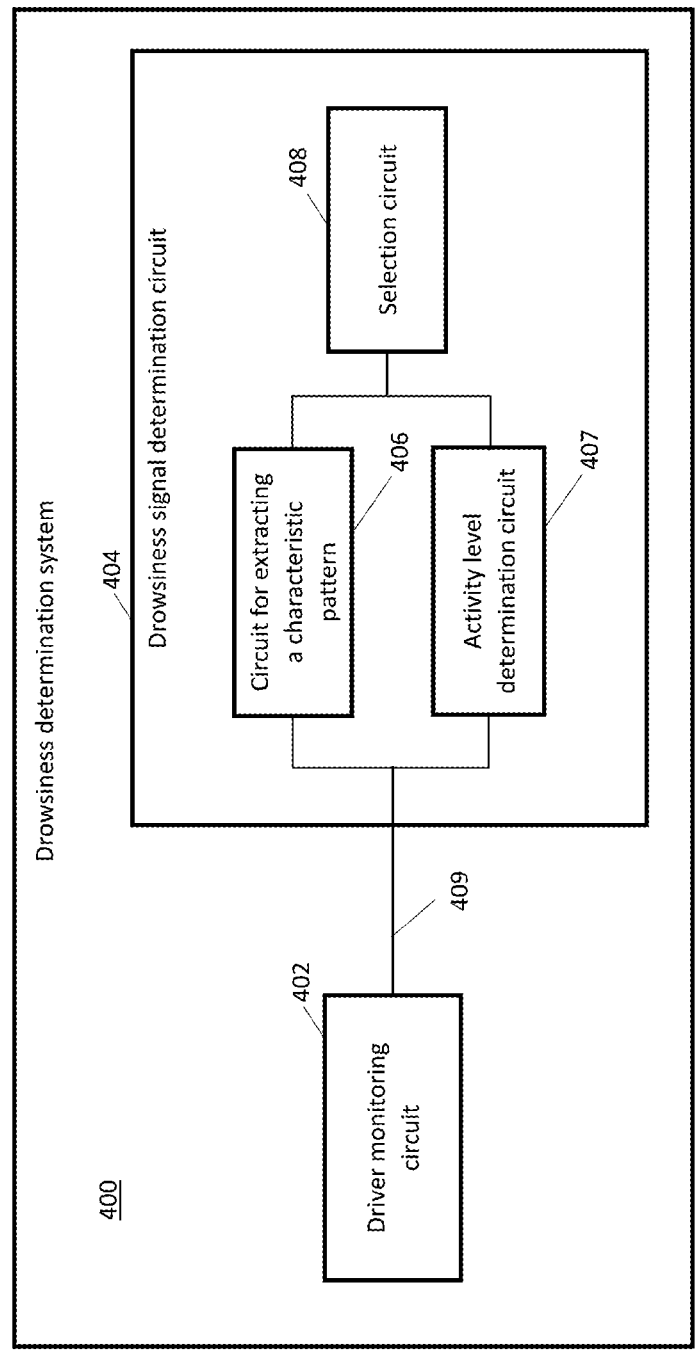
FIG. 4 illustrates a drowsiness detection system according to various embodiments.

FIG. 4 shows a drowsiness determination system 400 according to various embodiments. The drowsiness determination system 400 may include a driver monitoring circuit 402, a drowsiness signal determination circuit 404, a circuit 406 for extracting a characteristic pattern, an activity level determination circuit 407, and a selection circuit 408.

The driver monitoring circuit 402 may be configured to monitor the driver by capturing an image sequence of an interior of the vehicle via a camera system.

The drowsiness signal determination circuit 404 may be configures to determine a drowsiness signal indicative of the drowsiness of the driver and may therefore include the circuit 406 for extracting a characteristic pattern, the activity level determination circuit 407, and the selection circuit 408.

The circuit 406 for extracting a characteristic pattern may be configured to analyze the image sequence to extract a characteristic pattern of the driver, wherein the characteristic pattern may be indicative of drowsiness of the driver.

The activity level determination circuit 407 may be configured to determine an activity level of the driver based on the image sequence and/or an output signal provided by a sensor of the vehicle.

The selection circuit 408 may be configured to select at least one of the extracted characteristic pattern and the activity level associated with the driver as a basis for determining the drowsiness signal, wherein the selecting depends on a frame rate of the image sequence, a confidence level assigned to the characteristic pattern and a confidence level assigned to the activity level.

The driver monitoring circuit 402, the drowsiness signal determination circuit 404, the circuit 406 for extracting a characteristic pattern, the activity level determination circuit 407, and the selection circuit 408 may be coupled to each other, e.g. via an electrical connection 409, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 5:
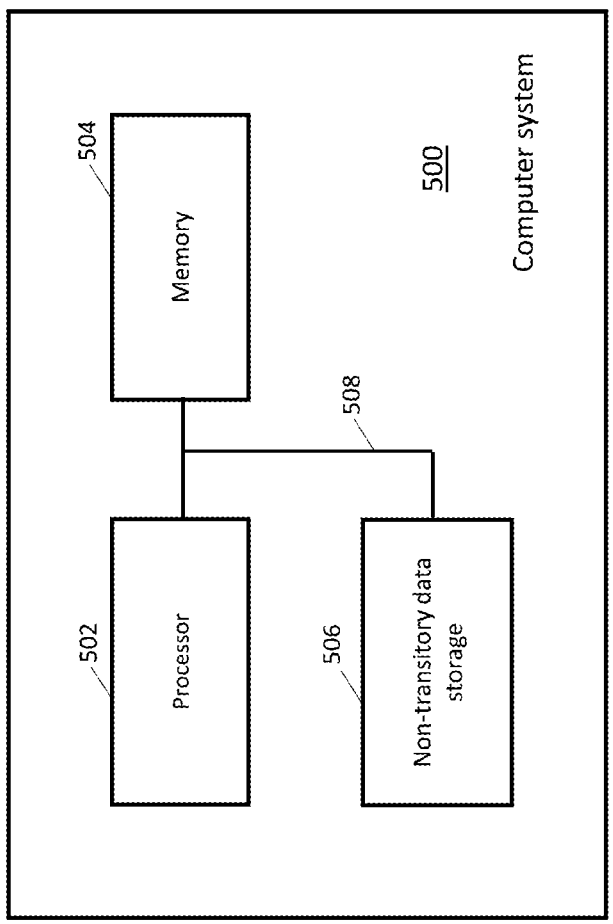
FIG. 5 illustrates a computer system including computer hardware components configured to carry out operations of a computer-implemented method for detecting drowsiness of a vehicle driver according to various embodiments.

FIG. 5 shows a computer system 500 with a plurality of computer hardware components configured to carry out operations of a computer implemented method for detecting drowsiness of a driver in a vehicle according to various embodiments. The computer system 500 may include a processor 502, a memory 504, and a non-transitory data storage 506.

The processor 502 may carry out instructions provided in the memory 504. The non-transitory data storage 506 may store a computer program, including the instructions that may be transferred to the memory 504 and then executed by the processor 502.

The processor 502, the memory 504, and the non-transitory data storage 506 may be coupled with each other, e.g. via an electrical connection 508, such as e.g. a cable or a computer bus or via any other suitable electrical connection to exchange electrical signals.

As such, the processor 502, the memory 504 and the non-transitory data storage 506 may represent the driver monitoring circuit 402, the drowsiness signal determination circuit 404, the circuit 406 for extracting a characteristic pattern, the activity level determination circuit 407, and the selection circuit 408, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the drowsiness detection system 400 and/or for the computer system 500.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

List of Reference Characters for the Elements in the Drawings. The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

- 110 camera system
- 112 camera
- 114 camera controller
- 116 image sequence
- 118 camera mode manager
- 120 processing unit
- 122 drowsiness estimation module
- 124 activity estimation module
- 130 vehicle system context
- 132 infotainment system
- 140 drowsiness signal
- 210 providing new image frames
- 220 algorithm for determining a base signal
- 222 Is a high frame rate available?
- 224 base signal or measured drowsiness
- 230 activity level estimation
- 232 activity
- 234 activity level
- 240 filtering a base signal
- 242 database for drowsiness level history
- 244 drowsiness trend
- 246 filtered drowsiness
- 250 decision for signal output
- 300 flow diagram illustrating a method for determining drowsiness of a driver in a vehicle
- 302 operation of monitoring a driver of a vehicle by capturing an image sequence of an interior of the vehicle via a camera system
- 303 operation of determining, via a processing unit, a drowsiness signal indicative of the drowsiness of the driver by performing the operations 304, 306 and 308

304 operation of analyzing the image sequence to extract a characteristic pattern of the driver, the characteristic pattern being indicative of drowsiness of the driver 306 operation of determining an activity level of the driver based on the image sequence and/or an output signal provided by a sensor of the vehicle 308 operation of selecting at least one of the extracted characteristic pattern and the activity level associated with the driver as a basis for determining the drowsiness signal, wherein the selecting depends on a frame rate of the image sequence, a confidence level assigned to the characteristic pattern and a confidence level assigned to the activity level 310 operation of providing the drowsiness signal as a result of drowsiness detection 400 drowsiness determination system 402 driver monitoring circuit 404 drowsiness signal determination circuit 406 circuit for extracting a characteristic pattern 407 activity level determination circuit 408 selection circuit 409 connection 500 computer system 502 processor 504 memory 506 non-transitory data storage 508 connection

What is claimed is:

1. A computer implemented method for determining drowsiness of a driver in a vehicle, the method comprising:
monitoring the driver by capturing an image sequence of an interior of the vehicle via a camera system; and
determining, via a processing unit, a drowsiness signal indicative of the drowsiness of the driver by:
analyzing the image sequence to extract a characteristic pattern of the driver, the characteristic pattern being indicative of drowsiness of the driver;
determining an activity level of the driver based on at least one of the image sequence or an output signal provided by a sensor of the vehicle; and
selecting at least one of the extracted characteristic pattern or the activity level associated with the driver as a basis for determining the drowsiness signal, the selecting based on at least one of a frame rate of the image sequence, a confidence level assigned to the characteristic pattern, or a confidence level assigned to the activity level;
wherein determining the activity level of the driver from the output signal provided by the sensor of the vehicle comprises:
receiving a signal from a microphone in proximity to the driver; and
determining the activity level of the driver based on the signal of the microphone.

2. The method according to claim 1, wherein determining the activity level of the driver based on the image sequence comprises:
recognizing a movement pattern of the driver in the image sequence; and
deriving the activity level from the movement pattern.

3. The method according to claim 2, wherein the movement pattern is associated with a predefined facial region of the driver.

4. The method according to claim 1, wherein the characteristic pattern is associated with at least one of a predefined facial region or with a change of a body posture of the driver.

5. The method according to claim 1, wherein:
a drowsiness signal trend is derived from the image sequence; and
the drowsiness signal is determined by further considering the drowsiness signal trend.

6. The method according to claim 1, wherein the camera system is configured to operate in at least one of a high frame rate mode with a predetermined rate of image frames or a low frame rate mode with a reduced rate of image frames which is lower than the predetermined rate, and wherein:
if the camera system is operating in the high frame rate mode, the drowsiness signal is determined based on the extracted characteristic pattern; and
if the camera system is operating in the low frame rate mode, the drowsiness signal is determined based on the activity level.

7. The method according to claim 6, wherein if the camera system is operating in the low frame rate mode:
a base signal is determined based on the extracted characteristic pattern; and
the drowsiness signal is determined via a parametrizable function depending from the base signal and from the activity level.

8. The method according to claim 7, wherein:
the characteristic pattern is associated with a movement of eye lids of the driver; and
if the camera system is operating in the high frame rate mode, the drowsiness signal is determined based on at least one of an eye opening or an eye blink frequency which are derived from the movement of the driver's eye lids.

9. The method according to claim 8, wherein the camera system is operated in the low frame rate mode if the camera system is involved in an internal vehicle process which reduces the rate of image frames being available for monitoring the driver.

10. The method according to claim 9, wherein if the camera system is operated in the low frame rate mode and the processing unit fails in determining the drowsiness signal based on the activity level, the camera system is switched to the high frame rate mode and the internal vehicle process is deactivated.

11. The method according to claim 10, wherein:
the internal vehicle process includes a video call; and
the activity level is determined by monitoring an engagement of the driver during the video call.

12. The method according to claim 11, wherein:
a set of vehicle parameters is received by the processing unit; and
operating the camera system in the low frame rate mode is disabled if one of the set of vehicle parameters is greater than a predefined threshold.

13. A computer system comprising:
one or more processors; and
memory storing one or more programs to be executed by the one or more processors, the one or more programs comprising instructions for:
monitoring a driver by capturing an image sequence of an interior of a vehicle via a camera system;
determining, via a processing unit, a drowsiness signal indicative of the drowsiness of the driver by:
analyzing the image sequence to extract a characteristic pattern of the driver, the characteristic pattern being indicative of drowsiness of the driver;
determining an activity level of the driver based on at least one of the image sequence or an output signal provided by a sensor of the vehicle; and selecting at least one of the extracted characteristic pattern or the activity level associated with the driver as a basis for determining the drowsiness signal, and the selecting based on at least one of a frame rate of the image sequence, a confidence level assigned to the characteristic pattern, or a confidence level assigned to the activity level;

comparing the drowsiness signal with a predetermined threshold; and in response to the drowsiness signal exceeding the predetermined threshold, performing at least one of: generating an alert within the vehicle to the driver; adapting an operation of an advanced driver assistance system (ADAS) to brake sooner; adapting an operation of the ADAS to keep a larger distance from other vehicles; or lowering a warning threshold of the ADAS.

14. The computer system according to claim 13, wherein determining the activity level of the driver based on the image sequence comprises:

recognizing a movement pattern of the driver in the image sequence; and deriving the activity level from the movement pattern.

15. The computer system according to claim 14, wherein the movement pattern is associated with a predefined facial region of the driver.

16. The computer system according to claim 13, wherein determining the activity level of the driver from the output signal provided by the sensor of the vehicle comprises:

receiving a signal from a microphone in proximity to the driver; and determining the activity level of the driver based on the signal of the microphone.

17. A non-transitory computer readable medium storing one or more programs, the one or more programs comprising instructions, which, when executed by a computer system with one or more processors, cause the computer system to perform operations comprising:

monitoring a driver by capturing an image sequence of an interior of a vehicle via a camera system;

determining, via a processing unit, a drowsiness signal indicative of the drowsiness of the driver by:

analyzing the image sequence to extract a characteristic pattern of the driver, the characteristic pattern being indicative of drowsiness of the driver;

determining an activity level of the driver based on at least one of the image sequence or an output signal provided by a sensor of the vehicle; and selecting at least one of the extracted characteristic pattern and the activity level associated with the driver as a basis for determining the drowsiness signal, and the selecting is based on at least one of a frame rate of the image sequence, a confidence level assigned to the characteristic pattern, or a confidence level assigned to the activity level;

comparing the drowsiness signal with a predetermined threshold; and in response to the drowsiness signal exceeding the predetermined threshold, performing at least one of: generating an alert within the vehicle to the driver; adapting an operation of an advanced driver assistance system (ADAS) to brake sooner; adapting an operation of the ADAS to keep a larger distance from other vehicles; or lowering a warning threshold of the ADAS.

18. The non-transitory computer readable medium according to claim 17, wherein determining the activity level of the driver based on the image sequence comprises:

recognizing a movement pattern of the driver in the image sequence; and deriving the activity level from the movement pattern.

19. The non-transitory computer readable medium according to claim 18, wherein the movement pattern is associated with a predefined facial region of the driver.

* * * * *